Figure 1A:
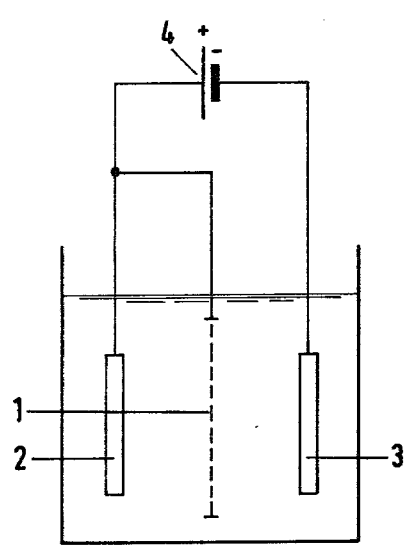

United States Patent [19]

Jansen

[11] 4,306,952
[45] Dec. 22, 1981

[54] ELECTROLYTIC PROCESS AND APPARATUS

[75] Inventor: Hermanus J. Jansen, Nieuwerkerk a/d IJssel, Netherlands

[73] Assignee: Magneto-Chemie B.V., Schiedam, Netherlands

[21] Appl. No.: 152,414

[22] Filed: May 22, 1980

[30] Foreign Application Priority Data

May 25, 1979 [NL] Netherlands .................. 7904150

[51] Int. Cl.³ .................. C02B 1/82; C25B 1/26
[52] U.S. Cl. .................. 204/149; 204/128; 204/130; 204/152; 204/228; 204/231
[58] Field of Search .............. 204/149, 128, 130, 152, 204/228, 231

[56] References Cited

U.S. PATENT DOCUMENTS

| | | | |
|---|---|---|---|
| 3,600,286 | 8/1971 | Sabins | 204/128 X |
| 3,785,954 | 1/1974 | Herbert | 204/149 X |
| 4,085,028 | 4/1978 | McCallum | 204/149 X |

Primary Examiner—Arthur C. Prescott
Attorney, Agent, or Firm—Scully, Scott, Murphy & Presser

[57] ABSTRACT

Method and apparatus for electrolyzing halogen salt solutions having a low halogen salt concentration with direct formation of halogen, using an electrolytic cell comprising at least one anode and at least two electrodes which can function as cathodes. The anode is permanently connected as an anode, a portion of the anodic current is passed through one electrode which can function as a cathode, and a cathodic current is passed through the other electrode which can function as a cathode. The polarity of the electrode functioning as a co-anode and of the electrode functioning as a cathode is periodically changed in cycles of 80–330 minutes.

8 Claims, 4 Drawing Figures

ELECTROLYTIC PROCESS AND APPARATUS

This invention generally relates to a method and apparatus for performing electrolytic processes, and in particular for the electrolysis of halogen salt solutions having a very low halogen salt concentration to form halogen, for example, to form chlorine in minor quantities for disinfection or swimming-pool water or waste water.

In one aspect, the invention relates to a method of carrying out an electrolytic process, in which for the removal of deposits on the cathode the polarity thereof is periodically made anodic, and which comprises (a) using at least one anode and at least two electrodes which can serve as cathodes;

(b) passing an anodic current through the anode so that said anode always remains the anode;

(c) passing a portion of the anodic current through an electrode which can serve as a cathode to remove the deposits formed thereon;

(d) passing a cathodic current through the other electrode which can serve as a cathode; and (e) periodically changing the polarity of the electrode functioning as a co-anode and the electrode functioning as a cathode.

In a prior method, the fouling of the cathodes is counteracted by periodically changing the polarity in cycles having a period of approximately 3 seconds to approximately 18 minutes, preferably of 5-6 minutes.

This prior method has the advantage over previous methods that it prevents the severe corrosion of the anode which is experienced owing to changing the polarity of the anode. This corrosion occurs in particular with anodes of modern electrode materials, such as titanium or a valve metal, such as tantalum, niobium and zirconium, to which an active layer of a noble metal or a mixture of noble metals or of noble metal oxides, possibly in admixture with oxides of titanium, tantalum, niobium or zirconium has been applied. Owing to the change in polarity, the active layer is rapidly dissolved, whereby the service life of the electrode is greatly reduced. This reduction in service life is the greater according as deposits are formed to a greater extent, which is the case at higher concentrations of calcium and magnesium, and when the electrolyte has a high pH, which will require more frequent pole-changing at a higher current density.

A great disadvantage of the prior method referred to is, however, that in the case of hard water, such as water having a hardness of more than 15° D., there will yet be severe deposition on the electrodes serving as cathodes.

I have now found that this disadvantage can be overcome by using pole-changing cycles of a specific period having a lower limit of approximately 80 minutes that is considerably higher than the period of pole-changing cycles that have hitherto been conventional.

According to the present invention the polarity of the electrode functioning as the co-anode and the electrode functioning as a cathode is changed in cycles of a period of from 80-330 minutes.

The period in the cycles in which the electrode which can serve as a cathode functions as a co-anode is preferably equal to, or substantially equal to, the period in which it functions as a cathode.

In a preferred embodiment of the method according to the invention, pole-changing cycles of a period of 120-240 minutes are used.

In a further preferred embodiment, the major portion of the total anodic current, in particular 85–97% of the total anodic current, is passed through the permanent anode.

The decalcification effect realized by the present method becomes somewhat greater according as the velocity of the water current along the electrodes becomes lower, for example, less than 1 m/sec. This improvement is realized in particular at velocities of less than 25 cm/sec.

The anode may consist of titanium of another valve metal, such as niobium, tantalum and zirconium, possibly provided with an activating layer. This activating layer may comprise one or more noble metals, noble metal oxides and/or valve metal oxides, possibly in the form of a mixture with a valve metal and/or a different oxide, such as cobalt oxide and silicon oxide. Preferably, the anode consists of titanium expanded mesh, activated with an activating layer of the above type.

A suitable electrode which can serve as a cathode may consist of the same material as the anode or of graphite, silicon, iron, stainless steel, magnetite, or any other material having both cathodic and anodic properties. It is also possible to use consumable electrodes as electrodes which can serve as cathodes, for example consisting of graphite or silicon iron. Preferably, use is made of electrodes of graphite, as these are durable and give good results.

In the present method, the anode always remains the anode, whereas the preferably plate-shaped electrodes on opposite sides of the anode are alternately a cathode. While one electrode is the cathode, the other is an anode, together with the permanent anode. A portion of the anodic current flows through the electrode which functions as an anode. This current may be supplied by a main source of current, with the permanent anode and the electrode functioning as an anode being parallel-connected. The anode current flowing through the electrode then functioning as a co-anode may also be supplied by a separate source of current. The polarity of the electrodes functioning as cathode and as co-anode is periodically changed so that the deposit formed on the electrode functioning as a cathode during the cathodic period may be removed.

It is also possible to use a plurality of anodes and cathodes with such a system of anodes and electrodes which periodically change in polarity being series-connected.

It may also be possible to have an AC current flow between the co-anode and the cathode, and a DC-current between the main anode and the cathode.

The method according to the invention may be used for the production of chlorine by means of electrolysis of sodium chloride in, for example, seawater, swimming-water or drinking-water, but is not of course so limited.

The invention also relates to an apparatus for carrying out the present electrolytic process in which the electrodes are connected to at least one source of current in such a manner as to provide at least one permanent anode, through which the major part of the anodic current flows, an electrode functioning as a co-anode, and an electrode functioning as a cathode, there being provided means for periodically changing the polarity of the electrode functioning as a co-anode and the electrode functioning as a cathode, the apparatus being characterized by the means for periodically changing the polarity of the electrodes being arranged so that the pole-changing can be effected in cycles having a period of 80–330 minutes. In an effective embodiment, the apparatus according to the invention comprises means for adjusting or controlling the portion of the current passing through the co-anode.

Preferably, in the apparatus according to the invention, the electrode functioning as a co-anode and the electrode functioning as a cathode are arranged on opposite sides of the permanent anode.

Furthermore, the anode of the apparatus according to the present invention is preferably a plate having openings therein, for example, of expanded mesh, or a perforated plate.

The invention will now be briefly described with reference to the accompanying drawings.

FIG. 1a shows a diagrammatic cross-sectional view of an electrolysis apparatus according to the present invention, comprising a plate-shaped permanent anode 1 of expanded mesh (i.e. an anode having openings therein), positioned between two electrodes 2 and 3, and a source of current 4. In this arrangement the electrode 2 is connected as a co-anode.

Figure 1B:
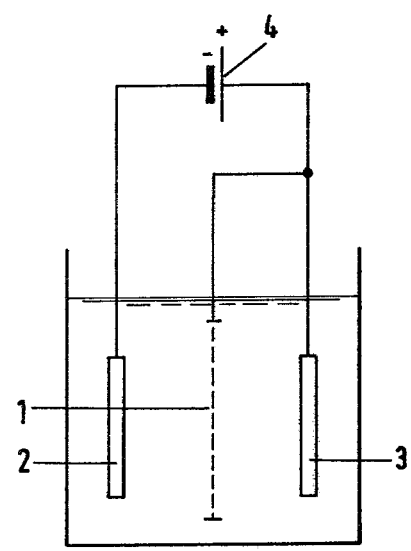

FIG. 1b shows the situation in which the polarity has been reversed so that the co-anode is again operated as a cathode.

Figure 2A:
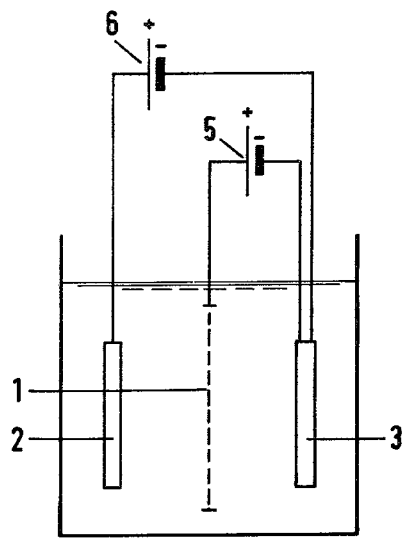

FIG. 2a shows a similar electrolysis cell according to the invention, in which the permanent anode 1 is again positioned between two electrodes 2 and 3 which can function as a cathode. The apparatus illustrated in this figure has two sources of current 5 and 6, and the electrode 2 is connected as a co-anode. Source of current 5 supplies the main current and source 6 the subsidiary current.

Figure 2B:
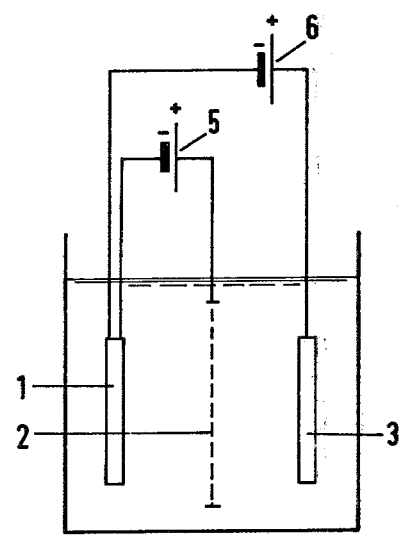

FIG. 2b shows the situation after pole-changing, in which the previous co-anode is connected to the negative pole of the two sources of current.

The invention is illustrated in and by the following examples.

EXAMPLES I AND II AND COMPARATIVE EXAMPLES I–III

For the generation of chlorine in the water of a swimming-pool having a chloride content of 500–1500 ppm, an electrolysis cell was placed in the circulation line, with which cell, by means of electrolysis, chlorine can be generated at the anode from the chloride present.

The cell consisted of a permanent anode of expanded mesh having a geometrical surface area of 3.2 dm$^2$ and an active surface area of 4.8 dm$^2$. Disposed on opposite sides of the anode were two electrodes of graphite having a surface area of 3.2 dm$^2$ each.

One electrode was connected for one period to the anode, while the other was connected to the negative pole of a source of current and hence functioned as a cathode, both relative to the expanded mesh anode and relative to the graphite electrode, which was parallel connected to the anode.

The expanded mesh anode consisted of titanium, activated with a 1$\mu$ thick coating of platinum and iridium in a 70:30 ratio.

Depending on the chlorine requirement in the pool, a voltage was applied to cause a current of 8–20 A to flow through the cell. Of this current, 0.8–1.5 A passed through the electrode connected in parallel to the anode so that the major part of the total anodic current passed through the permanent anode.

The water had a hardness of 19° D., and the calcium present in it caused a calcium compound deposit to be formed on the electrode connected as a cathode during this period. At the end of the period, the electrode connected to the anode was disconnected and coupled to the negative pole of the source of current, and the electrode connected to the negative pole was coupled to the anode. Accordingly, the graphite electrode operated in the preceding period as a cathode was now functioning as an anode, owing to which the calcium compound deposit was removed. The graphite electrode functioning as a co-anode in the preceding period was now operated as a cathode.

During a continuous process, this periodic change in polarity between the two graphite electrodes was continued with the voltage on the cell being kept constant, and this in cycles of two equal periods as listed in Table A. The results of the tests are also summarized in Table A.

TABLE A

| Examples and comparative examples | Duration of cycles of two equal periods | Test results |
|---|---|---|
| comparative example 1 | 15 min. | After 6 days, the current transmissivity had decreased by 40%, so that washing with acid was necessary |
| comparative example 2 | 60 min. | After 7 days the current transmissivity had been reduced by 40%, so that washing with an acid was necessary |
| Example I | 120 min. | After 50 days the current transmissivity had been reduced by 12% only; washing with an acid was not yet necessary |
| Example II | 180 min. | After 100 days the current transmissivity was reduced by 10% only; washing with acid was not yet necessary |
| comparative example 3 | 360 min. | After 7 days the current transmissivity was reduced by 45%, so that washing with an acid was necessary. |

The table clearly shows that the use of pole-changing cycles of a period within the range according to the present invention leads to surprisingly better results.

EXAMPLE III

For the production of chlorine in sea-water for disinfecting waste water, the sea-water was passed through an electrolytic cell in which, under the influence of electric current, chlorine was generated at the anode. The cell consisted of an anode of titanium expanded mesh having a geometrical surface area of 3.2 dm$^2$ and an active surface area of 4.8 dm$^2$. The titanium was activated with a coating of a mixture of ruthenium oxide and titanium oxide. Disposed on opposite sides of the anode were two electrodes of titanium having an activating coating similar to that of the anode (surface area 3.2 dm$^2$). The anode was connected to the positive pole of a first source of current.

During one period, one electrode was connected to the negative pole of the first source of current, and was accordingly operated as a cathode. The other electrode was connected to the positive pole of a second source of current, and functioned as a co-anode, the negative pole of the second source of current being connected to the electrode functioning as a cathode.

Depending on the chlorine requirement in the waste water, a current of 10–40 Amps was passed through the cell. The voltages were applied so that at all times the major portion of the total anodic current flowed through the permanent anode and a minor portion of the total anodic current through the electrode functioning as the co-anode, namely, 1–4 Amps. The velocity of the electrolyte along the plates was less than 5 cm/sec.

During the electrolysis in this period, a calcium compound was deposited on the cathode. In order to remove this, in a next period the electrode functioning as the cathode was detached from the negative poles of the two sources of current and connected to the positive pole of the second source of current, while the electrode functioning as co-anode was detached from the positive pole of the second source of current and connected to the negative poles of the two sources of current. Consequently, the electrode which in the preceding period was operated as a cathode functioned as an anode in the second period, whereby the deposit of calcium compound was removed. During operation, this periodic change in polarity of the electrodes was effected in 210 minutes' cycles of two equal period of 105 minutes.

Upon inspection of the cell after 3 months, no substantial deposition of calcium compound was found on the electrodes. Also, the active layer of the anode and the electrodes was still in good condition.

I claim:

1. An electrolytic process in which depositions on the cathode are removed by periodically rendering the polarity of the cathode anodic, comprising
   (a) using at least one anode and at least two electrodes which can function as cathodes;
   (b) passing an anodic current through the anode so that the anode always remains the anode;
   (c) passing a portion of the anodic current through an electrode which can serve as a cathode to remove deposits formed thereon;
   (d) passing a cathodic current through the other electrode which can serve as a cathode; and
   (e) periodically changing the polarity of the electrode functioning as a co-anode and the electrode functioning as a cathode, characterized by the step of periodically reversing the polarity of the electrode functioning as a co-anode and the electrode functioning as a cathode in cycles having a period of between 80–330 minutes.

2. A method as claimed in claim 1, wherein the step of periodically reversing includes periods in which the period in the cycles in which the electrode which can serve as a cathode functions as a co-anode is equal, or substantially equal, to the period in which it functions as a cathode.

3. A method as claimed in claim 1, including the step of passing the electrolyte along the electrodes with a velocity of less than 25 cm/sec.

4. A method as claimed in claim 1 or 2 or 3, including the step of passing 85–97% of the total anodic current through the permanent anode.

5. A method as claimed in claim 1 or 2 or 3, including the step of using an anode of titanium expanded mesh having an activating coating thereon.

6. A method as claimed in claim 1 or 2 or 3, including the step of using graphite electrodes which can serve as cathode.

7. A method as claimed in claim 1 or 2 or 3, including the step of using, for the electrodes which can serve as cathodes, electrodes of titanium with an active coating of one or more noble metals, noble metal oxides and/or valve metal oxides.

8. A method as claimed in claim 7, including using as said active coating a mixture of rhutenium oxide and titanium oxide.

* * * * *